(No Model.)

H. J. HUSH.
HALTER.

No. 464,283. Patented Dec. 1, 1891.

WITNESSES:
A. O. Babendreier.
J. P. Davis.

INVENTOR:
Harry J. Hush,

BY Chas. B. Mann
ATTORNEY.

UNITED STATES PATENT OFFICE.

HARRY J. HUSH, OF BALTIMORE, MARYLAND.

HALTER.

SPECIFICATION forming part of Letters Patent No. 464,283, dated December 1, 1891.

Application filed February 16, 1891. Serial No. 381,547. (No model.)

*To all whom it may concern:*

Be it known that I, HARRY J. HUSH, a citizen of the United States, residing at Baltimore city, in the State of Maryland, have invented certain new and useful Improvements in Halters, of which the following is a specification.

This invention relates to an improvement in slip-halters, and is designed for use in leading, managing, and hitching horses.

The invention consists in a halter formed of a single length of rope or like flexible material having suitably located a number of loops or their equivalents, the said rope passed through these loops in such manner that the halter can be simultaneously tightened on the horse's nose and over his head to bring him into submission.

It also comprises a hitching-tie for securing the halter to a stationary object.

Figure 1:
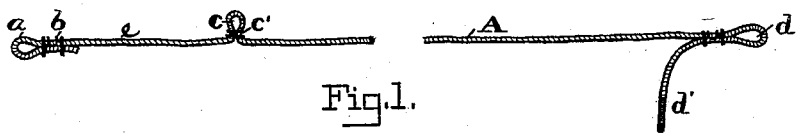
Figure 2:
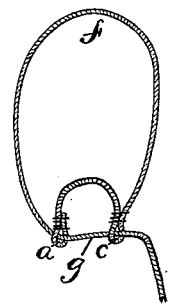
Figure 3:
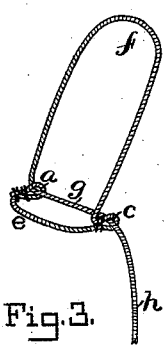
Figure 4:
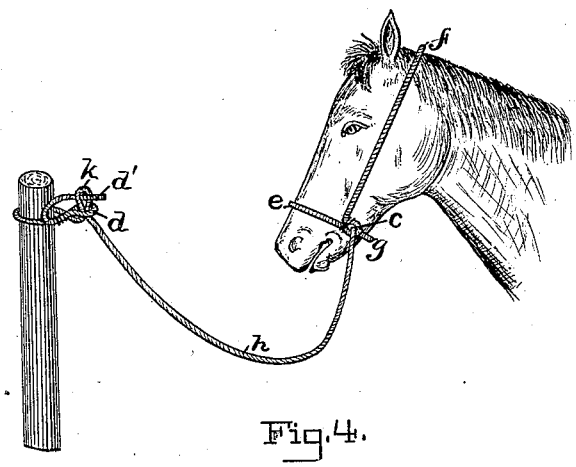

In the accompanying drawings, illustrating the invention, Figure 1 shows the rope of which the halter is made provided with the requisite loops. Fig. 2 shows the manner of forming the halter of this rope. Fig. 3 shows the halter made up. Fig. 4 shows it on a horse's head, and also shows the manner of securing it to a stationary object by the hitching-tie.

The letter A designates the rope of which the halter is made. At one end of the same a loop $a$ is formed by simply doubling back the rope end and securing it to the rope by a suitable fastening device $b$. A suitable distance from this end loop $a$ a second intermediate loop $c$ is made by again doubling back the rope and securing it by a fastening $c'$. A loop $d$ is made at the opposite end of the rope by doubling back the rope end and securing as in the first instance; but in making this latter loop a projecting end $d'$ of the rope is left, which is bound or wrapped in suitable manner to stiffen it and adapt it for use as a pin, in the manner hereinafter set forth.

To form the halter of this prepared rope, the end loop $a$ and intermediate loop $c$ are brought together, as shown in Fig. 2, and the opposite end of the rope is inserted through them, passing first through the end loop $a$, and enough of the rope is drawn through the said loops to leave between the second loop $c$ and end loop $a$ enough rope to constitute the headstall $f$, and between the end loop $a$ and loop $c$ to constitute the curb-band $g$. A halter is thus formed in which that portion $e$ of the rope between the said two loops $a$ and $c$ constitutes the nose-band; that portion $f$ which has not been drawn through the end loop $a$ the headstall, which fits over the animal's head behind the ears; that portion $g$ which extends from the end loop $a$ to the intermediate loop $c$ and runs through both of them the curb-band under the horse's lower jaw, and the remaining portion $h$, which has been passed through both loops, the hitching-strap. The halter has no throat-latch.

When this halter is fitted to the head, as shown in Fig. 4, it will be apparent that a pull upon the hitching-strap $h$ will draw the rope through the loop $c$ and tighten the curb-band $g$ and nose-band $e$, and as the rope also passes loosely through the end loop $a$ it will also draw the headstall $f$ down on the top of the head. Here may be had a combined tightening pressure around the nose and over the head. It will be seen that this same result will be effected if the horse attempts to break away.

The halter has the advantages of simplicity and cheapness, and it can be very readily applied.

The halter is secured to a stationary object as follows: The end of the hitching-strap $h$, having the loop $d$, is passed about the stationary object, and at a suitable point the rope is doubled and inserted through the said loop $d$. The projecting end $d'$ is then introduced through this looped portion $k$ of the rope, and it will be observed that it serves as a pin to prevent the withdrawal of the rope from the loop $d$. In this manner a simple and strong hitching-tie can be quickly and readily made.

Having thus described my invention, what I claim as new, and desire to secure by Letters Patent, is—

A halter consisting of a single piece of rope having two loops, one of which is at the end and the other one is near thereto, the portion of the rope between the loops forming the nose-band, and the main portion of the rope being passed loosely through said loops, thereby forming the headstall, the curb-band, and the hitching-strap out of continuous portions of the rope, whereby a pull upon the hitching-strap will tighten the curb-band and the headstall, the free end of the hitching-strap being adapted to be secured to an object, substantially as described.

In testimony whereof I affix my signature in the presence of two witnesses.

HARRY J. HUSH.

Witnesses:
AUSTIN J. KUHNS,
JOHN H. PRELLER.